US006227967B1

(12) United States Patent
Peretz

(10) Patent No.: US 6,227,967 B1
(45) Date of Patent: May 8, 2001

(54) PRIZE REDEMPTION GAME APPARATUS

(76) Inventor: David Peretz, 4801 Hollywood Blvd., Suite A, Hollywood, FL (US) 33021

( * ) Notice: Subject to any disclaimer, the term of this patent is extended or adjusted under 35 U.S.C. 154(b) by 0 days.

(21) Appl. No.: 09/261,973

(22) Filed: Mar. 3, 1999

(51) Int. Cl.[7] .................................................... A63F 13/00

(52) U.S. Cl. .................................. 463/7; 463/64; 463/58; 463/6; 273/138.2; 273/442; 273/127 R; 273/127 C; 273/118 R; 273/118 A; 273/122 R; 273/122 A

(58) Field of Search .............................. 463/16, 7, 6, 64, 463/58, 59, 65; 273/118 A, 108, 138.1, 138.2, 441, 442, 440, 459–461, 127 R, 127 C, 118 R, 122 R, 122 A, 119 A

(56) References Cited

U.S. PATENT DOCUMENTS

| | | | | |
|---|---|---|---|---|
| 3,865,377 | * | 2/1975 | Cooper et al. | 273/126 R |
| 5,011,147 | * | 4/1991 | Thomas et al. | 273/126 A |
| 5,029,863 | * | 7/1991 | Krawczyk et al. | 273/125 R |
| 5,676,371 | * | 10/1997 | Kelly et al. | 273/115 |

* cited by examiner

*Primary Examiner*—Benjamin H. Layno
(74) *Attorney, Agent, or Firm*—Liniak, Berenato, Longacre & White

(57) ABSTRACT

A prize redemption game apparatus includes an elongated runway, an elastic abutment member at the second end of the runway, and a rollable object disposed for rolling travel along the runway between the first end and the second end. The playing is disposed within an enclosure to prevent player interference with the object. The rollable object is adapted to be initially propelled in one direction from a starting position toward the abutment member and if the object engages with the abutment member it is propelled in an opposite direction by a rebounding force of the abutment member. The rollable object adapted to stop rolling while moving in either direction at a final position along the runway between the first end and the second end. An electronic game controller determines the position of the stopped object and determines a winning value associated with the final position. An electronic display system includes a first display board disposed along the runway for displaying multiple value zones and associated winning value for each value zone.

12 Claims, 3 Drawing Sheets

PRIZE REDEMPTION GAME APPARATUS

BACKGROUND OF THE INVENTION a) Field of the Invention

The invention is related to an entertainment and skill game for one or more players and, more particularly, to a game wherein an object, that is enclosed within a playing area, is propelled along a track until it strikes a means for reversing the direction of the object. The player's ability to control and regulate the striking force of the object determines the score and results in rewards to the player(s) and the enclosure prevents player interference with the object.

B) Description of Related Art

There exist various board games, game apparatuses and machines for one or more players where an object is propelled along a surface to obtain a score based on the player's ability to accurately control the speed and position of the object. However, these prior art games and devices suffer from inherent drawbacks in their ability (or lack of ability) to adequately calculate and relay the score for each player, as well as adequately challenge the skill level of each player. Additionally, the conventional gaming devices fail to include any means for changing and displaying multiple scoring zones and associated winning value for each scoring zone.

SUMMARY OF THE INVENTION

The invention is prize redemption game apparatus including an elongated runway having a first end and a second end, an elastic abutment member at the second end of the runway, and a rollable object disposed for rolling travel along the runway between the first end and the second end. The entire playing area is disposed within an enclosure and sensors are provided to prevent a player from interfering or otherwise altering the outcome of each attempt. The rollable object is adapted to be initially propelled in one direction from a starting position toward the abutment member and if the object engages with the abutment member it is propelled in an opposite direction by a rebounding force of the abutment member. The rollable object adapted to stop rolling while moving in either direction at a final position along the runway between the first end and the second end.

The invention features an electronic game controller which determines the position of the stopped object and determines a winning value associated with the final position.

The game apparatus features an electronic display system including a first display board disposed along the runway for displaying multiple value zones and associated winning value for each value zone. The electronic display system is connected with the electronic game controller to allow the winning value to be determined.

The game controller is capable of varying the first display board to change the score zones and the winning values between successive plays of the game propelling the object.

Another aspect of the game apparatus according to the invention is a prize dispensing system for dispensing a prize based on the winning value determined by the game controller. The prize dispensing system is controlled by the game controller.

The prize dispensing system may include a ticket issuing device which issues according to the wining value.

The prize dispensing system may include a toy or candy prize dispensing unit which dispenses a toy or candy prize according to the winning value.

The game apparatus according to the invention further features an automated object return mechanism for automatically retrieving and returning the object from the final position to the initial position. The automated object return mechanism is controlled by the game controller. In the preferred embodiment, the object return mechanism uses an elongated spring rod that engages a horizontal bar under the chassis of the car, which allows a motorized pulley to move the spring and car back to the player.

The game apparatus also features a second display board for displaying a player's status information and wining value information for the player.

The invention further includes an automated game initiation system for initiating a predetermined number of games to be played on the game apparatus by insertion of a predetermined number of coins associated with the predetermined number of games into a coin receptacle. The automated game initiation system is controlled by the game controller.

These and other features of the invention will become apparent to those skilled in the art when taken in connection with the following description and drawings.

DETAILED DESCRIPTION OF THE INVENTION

Figure 1:
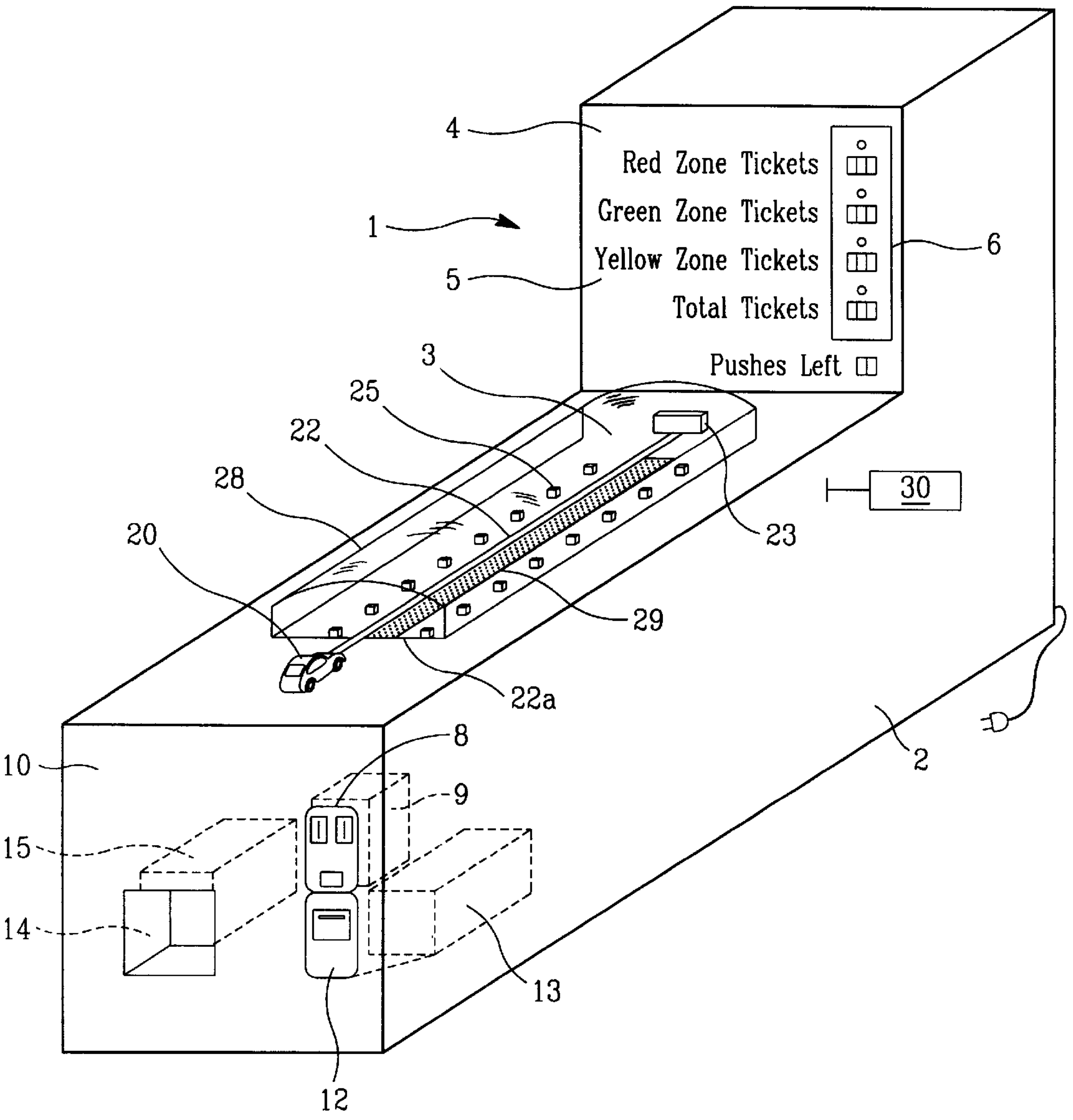
FIG. 1 is a perspective view showing an external view of a game machine embodying the present invention with references to internal components of the game machine.

Referring now to FIG. 1, an exterior of the game machine 1 embodying the present invention is shown in perspective view. The game machine includes a generally box-shaped housing 2 having a game playing portion 3 defined in a top surface of the housing and an upright game display portion 4 on a rear of the housing. The display portion 4 is provided with characters 5 and/or figures on an outer surface thereof and an illuminated display board 6 which indicates a players score and remaining plays. A coin input area 8 to an internal coin-operated unit 9 is present on a front surface 10 of the housing, as is a prize ticket output portion 12 from an internal prize ticket issuing device 13. Also located on the front surface 10 is a toy prize dispensing bin 14 which dispenses toys prizes from an internal toy dispensing unit 15.

The game playing portion 3 of the game machine has a game car 20 positioned within a guide track 22 which extends substantially along the length of the game playing portion from the front 10 of the housing to the display portion 4. The car 20 has rotatable wheels which roll when the car is pushed by a player, against the surface of the game playing portion adjacent the track 22. The car 20 has an undercarriage which engages the guide track 22 to maintain the car 20 in an upright and guided position along the track 22. To prevent a player from interfering with the position of the car 20 during play, the game playing portion 3 is substantially enclosed within a plastic opaque enclosure 28. During the play of the game, a player manually pushes the car 20 from the front end of the guide track 22 toward the far end of the track. On the undercarriage of the car, there is a horizontal tab that permits the optical switches on the bottom of the playing surface to locate the position of the car on the track. The far end of the guide track is provided with a rubber recoil bumper 23 which projects the car 20 in a reverse direction back toward the front end of the guide track.

Adjacent to the track 22 on opposite sides thereof are located dome lights 25 which become illuminated as the car 20 passes. A portion of the undercarriage of the car located below the game playing surface 3 cooperates with optical sensor switches located below the game surface (not shown) to the dome lights 25, such as will be understood by those skilled in the art, to illuminate the lights 25 as the car passes. In a first portion of the guide track 22 a foul line 22*a* is displayed upon the playing surface which has a corresponding foul line sensor switch (not shown) to indicate a foul (i.e. the player's hand crossing the foul line 22*a*) committed during a play of the game. The foul line sensor is preferably a motion detecting sensor provided at the foul line 22*a*. Also provided adjacent to the guide track is a score zone display 29 board which illuminates during the play of the game device to indicate the scoring zones located between the dome lights 25 provided for the particular game as it is played. The optical sensor switches additionally provide signal as to the location of the car to a computerized game controller 30.

The game controller 30 randomly selects a scoring zone scenario prior the game play which is lit up on the display board 29 so as to add an enhanced element of skill to the game play, as each game is not a repeat of the previous. The player has a different scoring zone displayed for each turn, so that the position which the player attempts to land the car will be different for each push. The final position of the car 20 is known by the controller 30 via the optical sensors and the car location is matched with the scoring zone indicated by the score zone display board 29 to determine the final score of the game played. The scoring information is displayed on the display board 6.

In the illustrative embodiment of the game machine 1 described herein, the scoring zone correspond to a number of prize tickets and toy prizes. The scoring zones can include a preselected final car location for winning toy prizes. The game controller 30 changes the score zone scenario by varying the location and sizes of the scoring zones for each turn at pushing the car 20. This can also include have a car landing sequence that must be achieved in consecutive pushes to dispense a toy prize in addition to prize tickets.

For a certain coin deposit amount into the coin input area 8, a player is given a predetermined number of turns to accumulate as many tickets or toy prizes as possible. The number of turns for a given player will be displayed on the display portion 6. At the end of the players turns, the total number of prize tickets and toy prizes will be dispensed via the internal ticket issuing device 13 and toy dispensing unit 15. The game controller interacts with the coin operated unit to initiate the game play and to display the number of games remaining to be played. The particulars of the coin operated unit are not considered to be critical to the invention, and as such any known type of coin operated unit suitable for the game machine according to the invention may be employed.

Figure 2:
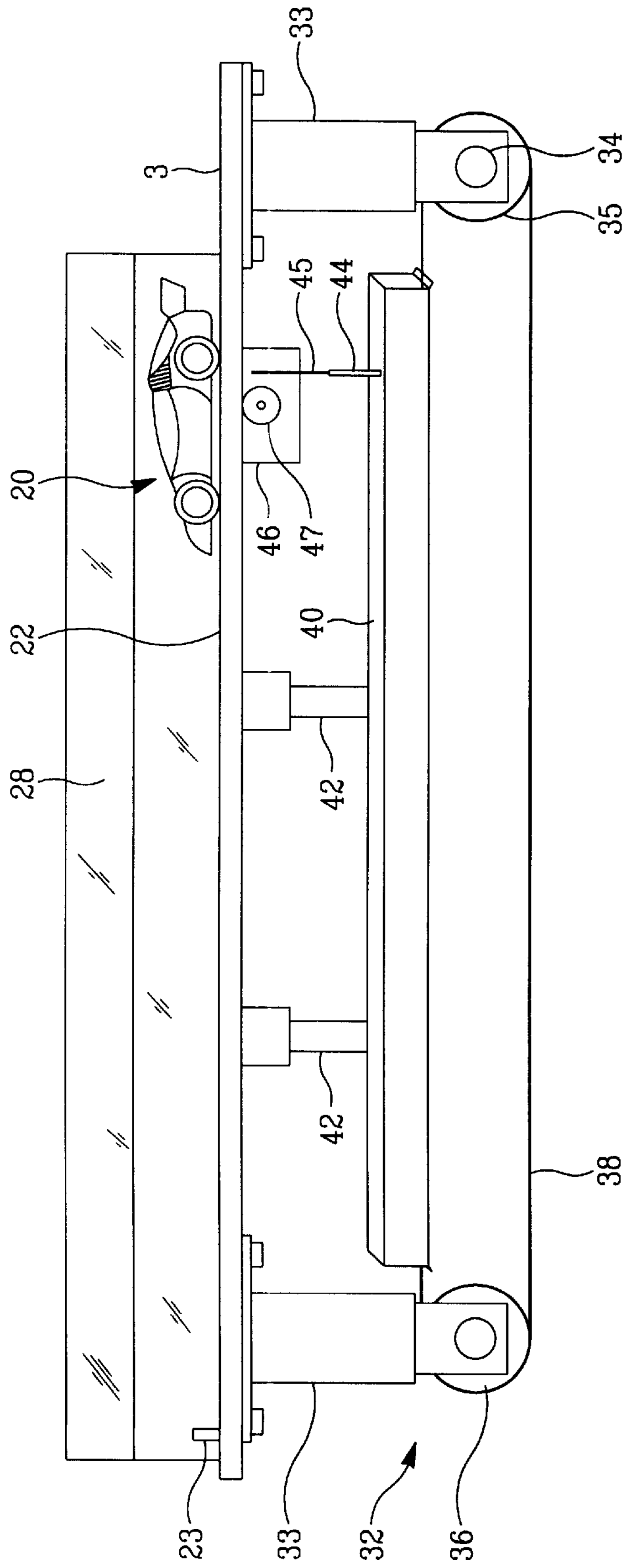
FIG. 2 is a vertical partial side view showing an internal pulley system employed by the game machine according to the invention.

Referring now to FIG. 2, the mechanics of the game machine will be described. FIG. 2 shows a partial side view of the inside of the game housing 2 which includes a car return pulley system 32 which is used to return the car 20 back to the player at the starting position of the track 22 after each turn. The pulley system 32 includes two support brackets 33 mounted to the underside of the game playing portion 3 of the housing. A reversible motor 34 is supported by one of the support brackets 33. A drive pulley 35 is connected to a shaft (not shown) of the motor 34 so as to be rotated by the motor. A idler pulley 36 is supported on the other support bracket 33 by suitable bearings (not shown) to allow the idler pulley 36 to rotate. A belt 38 is driven by the rotation of the drive pulley 35.

A belt channel 40 guides and supports the belt 38 to prevent the belt from creeping off center of the pulleys 35, 36 and to support the underside of the belt between the pulleys from sagging. The belt channel 40 is held by support members 42 which are mounted to the underside of the game playing portion 3. An upright rod 44 is attached to the upper surface of the belt 38, and a flexible spring member 45 is attached to the rod and extends upward therefrom. The undercarriage of the car 20 has a plate member 46 which extends downward from the underside of the car 20 passing through the guide track 22. The guide plate 46 support an idler pulley 47 which is free to rotate.

Once a player has taken a turn at pushing the car 20 from the starting position as shown in FIGS. 1 and 2, and it has recoiled back down the track 22 from the recoil bumper 23 and landed in a final position, the game controller 30, signals the pulley motor 34 to advance the belt 38 and rod 44 to retrieve the car 20. As the rod 44 is moved by the belt 38 past the car position, the spring member 45 flexes and bends so as to pass against the a horizontal rod connecting pulley 47 to plate 46, positioning the rod 44 on the opposite side of the pulley 47. Then the motor 34 is reversed and the belt 38 and rod 44 are moved back toward the pulley 47. On the return of the car 20, the rod 44 and spring member 45 remain upright against the pulley 47 to push the car back to the starting position. When the car reaches the stating position, the plate 46 hits a stop against the end of the track 22. The belt 38 continues to advance the rod 44 so as to bend the spring member 45 past the pulley 47 to position shown in FIG. 2. Then the car is in position to be pushed again by the player.

The rubber recoil bumper 23 is used to limit the return of the car back down the track after striking the bumper 23. The bumper is designed to restrict the maximum return speed of the car, by absorbing the kinematic energy of the car as it strikes the bumper, thereby slowing the speed of the car. The bumper is also used to protect the both the car 20 and the housing cabinet from damage, which could otherwise occur under excessively hard pushes by a player. A solid rubber block is depicted in the described embodiment. However, other rubberized bumpers may be employed, such as a rubber strap or band extended between two support members or pins.

Figure 3:
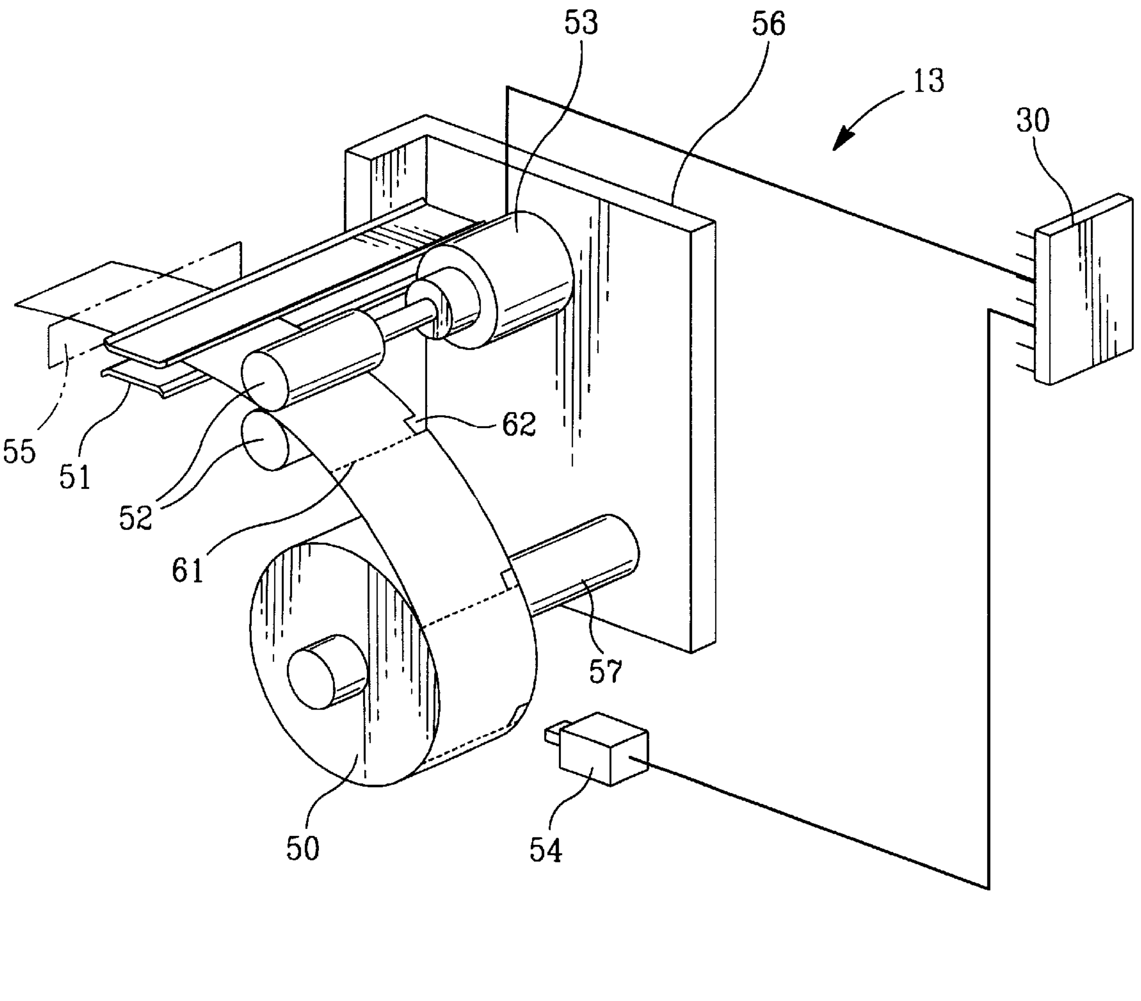
FIG. 3 is a perspective view showing a prize ticket issuing device provided in the game machine according to the invention.

Next, the prize ticket issuing device 13 will be described with reference to FIG. 3. The prize ticket issuing device 13 issues tickets corresponding to the total score achieved by a player. The device 13 includes a support plate 56 attached to an inner surface (not shown) of the housing 2 in an appropriate location adjacent the ticket dispensing portion 12 shown in FIG. 1, a supporting shaft 57 attached to the support plate 56, a rolled ticket tape 50 mounted on the support shaft 57, guide plates 51 attached to the support plate for guiding the issued tickets to an outlet window 55 provided in the ticket dispensing output 12, a pair of feed rollers 52 upstream of the guide member 51 for feeding the ticket tape 50 forward, and a motor 53 supported on the support plate 56 for driving the feed rollers 52.

The ticket tape 50 is provided with a number of sections having the same length. Each section is printed with a particular figure or character. Also, perforations 61 are provided between adjacent tickets to facilitate the tearing off of the dispensed tickets from the ticket tape 50. Markings 62 may be provided on the tickets which are recognized by a sensor 54 that communicated with the game controller 30 to count the number of tickets dispensed and to control the motor 53 to feed the correct amount of ticket tape or tickets corresponding to the game score. It will be appreciated that other ticket dispensing means may be employed in the game machine without departing from the spirit of the invention, and that of course, the ticket issuing device 13 as described in connection with the game machine according to the invention can be omitted from the game machine in favor of the toy dispensing unit 15 alone, or vise versa.

The toy dispensing unit 15 is an optional component to the game machine according to the invention. The toy dispensing unit 15 may employ a known device such as those common to vending machine. In such vending machines, a wire spiral coil connected to a motor is driven by the motor to turn a predetermined amount and dispense an item retained in between the spirals of the coil, at the end of the spiral furthest from the motor. When the game controller in the present invention determines that a prize item has been won by the player, the game controller signals the motor in the dispensing unit to rotate the coil, and an item is released from the coil and dropped in to the dispensing bin 14. Of course other types of dispensing units may be employed without departing from the spirit of the invention, and further a variety of items may be dispensed such as toy cars, candy or snacks, stuffed animals, etc.

While the invention has been described with references to various embodiments, the description is illustrative and is not to be construed as limiting the scope of the invention. Various modifications and changes may occur to those skilled in the art without departing from the spirit and scope of the invention as defined by the appended claims.

What is claimed is:

1. A prize redemption game apparatus comprising an elongated runway having a first end and a second end, an elastic abutment member at the second end of said runway, a movable object disposed for translational travel along the runway between the first end and the second end, said movable object being adapted to be initially propelled in one direction from a starting position toward said abutment member and if engage with said abutment member and then propelled in an opposite direction by a rebounding force of said abutment member, said movable object adapted to stop moving while moving in either direction at a final position along said runway between said first end and said second end, an electronic game control means for determining said position of the stopped object and determining a winning value associated with said final positions, said apparatus further comprising electronic display means including a first display means disposed along said runway for displaying multiple scoring zones and associated winning value for each scoring zone, said electronic display means connected with said electronic game control means to allow said winning value to be determined.

2. The game apparatus according to claim 1, wherein said game control means is capable of varying said first display means to change said scoring zones and said winning values between successive tries of a player propelling said object.

3. The game apparatus according to claim 1, further comprising a prize dispensing means for dispensing a prize based on the winning value determined by said game control means, wherein said prize dispensing means is controlled by said game control means.

4. The game apparatus according to claim 3, wherein said prize dispensing means includes a ticket issuing device which issues according to the winning value.

5. The game apparatus according to claim 4, wherein said prize dispensing means includes a toy or candy prize dispensing unit which dispenses a toy or candy prize according to the winning value.

6. The game apparatus according to claim 3, wherein said prize dispensing means includes a toy or candy prize dispensing unit which dispenses a toy or candy prize according to the winning value.

7. The game apparatus according to claim 1, further comprising automated object return means for automatically retrieving and returning said object from said final position to said initial position.

8. The game apparatus according to claim 7, wherein said automated object return means is controlled by said game control means.

9. The game apparatus according to claim 1, wherein said electronic display means includes a second display means for displaying a player's status information and winning value information for said player.

10. The game apparatus according to claim 1, further comprising an automated game initiation means for initiating a predetermined number of games to be played on said game apparatus by insertion of a predetermined number of coins associated with said predetermined number of games into a coin receptacle, said automated game initiation means controlled by said game control means.

11. A prize redemption game apparatus comprising an elongated runway having a first end and a second end, an elastic abutment member at the second end of said runway, a movable object disposed for translational travel along the runway between the first end and the second end, said movable object being adapted to be initially propelled in one direction from a starting position toward said abutment member and if engage with said abutment member and then propelled in an opposite direction by a rebounding force of said abutment member, said movable object adapted to stop moving while moving in either direction at a final position along said runway between said first end and said second end, an electronic same control means for determining said position of the stopped object and determining a winning value associated with said final position, said apparatus further comprising an enclosure for preventing a player's interference with a final stopping position of the movable object, and at least one foul line sensor for detecting an attempt at said player's interference.

12. A prize redemption game apparatus comprising an elongated runway having a first end and a second end, an elastic abutment member at the second end of said runway, a movable object disposed for translational travel along the runway between the first end and the second end, said movable object being adapted to be initially propelled in one direction from a starting position toward said abutment member and if engage with said abutment member and then propelled in an opposite direction by a rebounding force of said abutment member, said movable object adapted to stop moving while moving in either direction at a final position along said runway between said first end and said second end, an electronic game control means for determining said position of the stopped object and determining a winning value associated with said final position, said apparatus further comprising automated object return means for automatically retrieving and returning said object to said initial position, said automated object return means comprising a horizontal pulley assembly mounted on an underside of said object that allows a vertical spring mounted to a pulley system to return said object to said initial position.

* * * * *